US008362163B2

(12) United States Patent
Carnahan

(10) Patent No.: US 8,362,163 B2
(45) Date of Patent: Jan. 29, 2013

(54) TETHERED SUPPORTED TRANSITION METAL COMPLEX

(75) Inventor: Edmund M. Carnahan, Fresno, TX (US)

(73) Assignee: DOW Global Technologies, LLC, Midland, MI (US)

( * ) Notice: Subject to any disclaimer, the term of this patent is extended or adjusted under 35 U.S.C. 154(b) by 693 days.

(21) Appl. No.: 12/529,966

(22) PCT Filed: Mar. 5, 2008

(86) PCT No.: PCT/US2008/055843
§ 371 (c)(1),
(2), (4) Date: Sep. 4, 2009

(87) PCT Pub. No.: WO2008/109628
PCT Pub. Date: Sep. 12, 2008

(65) Prior Publication Data
US 2010/0016527 A1    Jan. 21, 2010

Related U.S. Application Data

(60) Provisional application No. 60/905,557, filed on Mar. 7, 2007.

(51) Int. Cl.
*C08F 4/76* (2006.01)
*C08F 4/64* (2006.01)
*C08F 4/52* (2006.01)

(52) U.S. Cl. ......... 526/172; 526/161; 526/129; 526/130
(58) Field of Classification Search .................. 526/172, 526/161, 130, 139
See application file for complete search history.

(56) References Cited

U.S. PATENT DOCUMENTS

| | | | |
|---|---|---|---|
| 3,687,920 A | 8/1972 | Johnson | |
| 3,879,368 A | 4/1975 | Johnson | |
| 4,542,119 A | 9/1985 | Hsu et al. | |
| 4,665,208 A | 5/1987 | Welborn, Jr. et al. | |
| 4,874,734 A | 10/1989 | Kioka et al. | |
| 4,908,463 A | 3/1990 | Bottelberghe | |
| 4,924,018 A | 5/1990 | Bottelberghe | |
| 4,952,540 A | 8/1990 | Kioka et al. | |
| 4,968,827 A | 11/1990 | Davis | |
| 5,066,741 A | 11/1991 | Campbell, Jr. | |
| 5,091,352 A | 2/1992 | Kioka et al. | |
| 5,103,031 A | 4/1992 | Smith, Jr. | |
| 5,153,157 A | 10/1992 | Hlatky et al. | |
| 5,157,137 A | 10/1992 | Sangokoya | |
| 5,192,731 A | 3/1993 | Kioka et al. | |
| 5,198,401 A | 3/1993 | Turner et al. | |
| 5,204,419 A | 4/1993 | Tsutsui et al. | |
| 5,206,197 A | 4/1993 | Campbell, Jr. | |
| 5,206,199 A | 4/1993 | Kioka et al. | |
| 5,235,081 A | 8/1993 | Sangokoya | |
| 5,241,025 A | 8/1993 | Hlatky et al. | |
| 5,248,801 A | 9/1993 | Sangokoya | |
| 5,308,815 A | 5/1994 | Sangokoya | |
| 5,329,032 A | 7/1994 | Tran et al. | |
| 5,384,299 A | 1/1995 | Turner et al. | |
| 5,387,568 A | 2/1995 | Ewen et al. | |
| 5,391,529 A | 2/1995 | Sangokoya | |
| 5,391,793 A | 2/1995 | Marks et al. | |
| 5,399,636 A | 3/1995 | Alt et al. | |
| 5,427,991 A * | 6/1995 | Turner | 502/103 |
| 5,453,410 A | 9/1995 | Kolthammer et al. | |
| 5,498,581 A | 3/1996 | Welch et al. | |
| 5,502,124 A | 3/1996 | Crowther et al. | |
| 5,587,439 A | 12/1996 | DiMaio | |
| 5,693,838 A | 12/1997 | Sangokoya et al. | |
| 5,712,352 A | 1/1998 | Brant et al. | |
| 5,731,253 A | 3/1998 | Sangokoya | |
| 5,731,451 A | 3/1998 | Smith et al. | |
| 5,744,656 A | 4/1998 | Askham | |
| 5,747,405 A | 5/1998 | Little et al. | |
| 5,763,543 A | 6/1998 | Muhle et al. | |
| 5,849,852 A | 12/1998 | Koch et al. | |
| 5,869,723 A | 2/1999 | Hinokuma et al. | |
| 6,040,261 A | 3/2000 | Hlatky | |
| 6,087,293 A * | 7/2000 | Carnahan et al. | 502/158 |
| 6,103,657 A | 8/2000 | Murray | |
| 6,194,343 B1 * | 2/2001 | Collins et al. | 502/158 |
| 6,197,715 B1 * | 3/2001 | Bansleben et al. | 502/155 |
| 6,320,005 B1 | 11/2001 | Murray | |
| 6,395,671 B2 | 5/2002 | LaPointe | |
| 6,653,417 B2 | 11/2003 | Peterson | |
| 6,852,811 B1 * | 2/2005 | Carnahan et al. | 526/126 |
| 6,884,749 B2 * | 4/2005 | Neal-Hawkins et al. | 502/120 |
| 6,906,160 B2 | 6/2005 | Stevens et al. | |
| 6,919,407 B2 | 7/2005 | Tau et al. | |
| 6,927,256 B2 | 8/2005 | Stevens et al. | |

(Continued)

FOREIGN PATENT DOCUMENTS

EP    0 277 003 A1    8/1988
EP    0 277 004 A1    8/1988

(Continued)

OTHER PUBLICATIONS

Carnahan, E.M., et al., Supported Metallocene Catalysts, Cat Tech, 2000, 4, 78.
Hird, Nicholas W., Solid Phase Synthesis of 2-Aminobutadienes Using a Piperazine Linker, Tetrahedron Letters, 1997, vol. 38, No. 40, pp. 7111-7114.
Hlatky, Gregory G., Heterogeneous Single-Site Catalysts for Olefin Polymerization, Chemical Reviews, 2000, 100(4), 1347-1376, Washington, D.C.
CN Application No. 200880014501.8 First Office Action dated Mar. 30, 2011, Examiner Comments Translation.
CN Application No. 200880014501.8, Response to First Office Action dated Mar. 30, 2011, Cover Letter From Agent.

(Continued)

Primary Examiner — Rip A. Lee

(57) ABSTRACT

A supported metal complex comprising the reaction product of a transition metal complex of a polyvalent heteroaryl donor ligand containing at least one ortho-metallated aromatic ligand group and an ethylenically or poly(ethylenically) functionalized particulated organic or inorganic solid, a method for preparing the same and the use thereof as an addition polymerization catalyst.

15 Claims, No Drawings

U.S. PATENT DOCUMENTS

| | | |
|---|---|---|
| 6,943,133 B2 * | 9/2005 | Vogel .................. 502/104 |
| 6,953,764 B2 | 10/2005 | Frazier et al. |
| 7,491,672 B2 * | 2/2009 | Carnahan et al. ........ 502/232 |
| 2002/0082161 A1 | 6/2002 | Vogel |
| 2002/0142912 A1 | 10/2002 | Boussie et al. |
| 2004/0005984 A1 | 1/2004 | Boussie et al. |
| 2004/0220050 A1 | 11/2004 | Frazier et al. |
| 2006/0264320 A1 | 11/2006 | Rodriguez et al. |

FOREIGN PATENT DOCUMENTS

| | | |
|---|---|---|
| EP | 0 279 586 A2 | 8/1988 |
| EP | 338044 A1 | 10/1989 |
| EP | 0 426 637 A2 | 5/1991 |
| EP | 0 495 375 A2 | 7/1992 |
| EP | 0 500 944 A1 | 9/1992 |
| EP | 0 520 732 | 12/1992 |
| EP | 0 561 476 A1 | 9/1993 |
| EP | 0 570 982 A1 | 11/1993 |
| EP | 0 573 120 A1 | 12/1993 |
| EP | 0 573 403 A2 | 12/1993 |
| EP | 0 594 218 A1 | 4/1994 |
| EP | 0 615 981 A2 | 9/1994 |
| EP | 0 781 299 B1 | 7/1997 |
| EP | 791609 A2 | 8/1997 |
| EP | 874005 A1 | 10/1998 |
| WO | WO-91/09882 A1 | 7/1991 |
| WO | WO-94/03506 A1 | 2/1994 |
| WO | WO-94/07928 A1 | 4/1994 |
| WO | WO-94/10180 A1 | 5/1994 |
| WO | WO-95/14044 A1 | 5/1995 |
| WO | WO-96/08520 A1 | 3/1996 |
| WO | WO-98/03521 A1 | 1/1998 |
| WO | WO-98/07515 A1 | 2/1998 |
| WO | WO-98/09913 A1 | 3/1998 |
| WO | WO-98/09996 A1 | 3/1998 |
| WO | WO-98/32775 A1 | 7/1998 |
| WO | WO-98/43983 A1 | 10/1998 |
| WO | WO-99/18135 A1 | 4/1999 |
| WO | WO-00/20377 A1 | 4/2000 |
| WO | WO-01/30860 A1 | 5/2001 |
| WO | WO-01/46201 A1 | 6/2001 |
| WO | WO-02/24331 A2 | 3/2002 |
| WO | WO-02/38628 A2 | 5/2002 |
| WO | WO-03/037937 A1 | 5/2003 |
| WO | WO-03/040195 A1 | 5/2003 |
| WO | WO-2004/094487 A1 | 11/2004 |
| WO | WO-2006/007094 A2 | 1/2006 |
| WO | WO-2006/020624 A1 | 2/2006 |
| WO | WO-2006/036748 A2 | 4/2006 |

OTHER PUBLICATIONS

CN Application No. 200880014501.8, First Office Action dated Mar. 30, 2011, ExaminerComments.
CN Application No. 200880014501.8, First Office Action dated Mar. 30, 2011.
CN Application No. 200880014501.8, First Office Action dated Mar. 30, 2011, Cover Letter From Agent CN.
CN Application No. 200880014501.8, Response to First Office Action dated Mar. 30, 2011.
CN Application No. 200880014501.8, Response to First Office Action dated Mar. 30, 2011, English Amended Claims.
EP Application No. 08 731 387.0 Search Opinion.
EP Application No. 08 731 387.0 Supplemental Search Report.
PCT/US2008/055843, International Search Report.
PCT/US2008/055843, Written Opinion of the International Searching Authority.
PCT/US2008/055843, International Preliminary Report on Patentability.

* cited by examiner

TETHERED SUPPORTED TRANSITION METAL COMPLEX

CROSS-REFERENCE TO RELATED APPLICATIONS

This application is a national stage application under 35 USC §371 based on international application PCT/US2008/55843 filed on Mar. 5, 2008 which claims priority to US Provisional Application Ser. No. 60/950,557 filed on Mar. 7, 2007.

BACKGROUND OF THE INVENTION

This invention relates to supported transition metal complexes formed from vinyl- or poly(vinyl)-functionalized supports that are useful as addition polymerization catalysts, especially as catalysts for polymerization of olefins. More particularly, the invention relates to readily formable supported catalysts comprising a metal complex that is chemically bound or tethered to the support through a non-fugitive ligand group. The invention also relates to the preparation of such supported compositions, to their use in an olefin polymerization process, and to certain functionalized supports particularly adapted to this use.

Numerous supported catalysts for use in addition polymerizations have been previously disclosed in the art. WO-91/09882 described a supported catalyst prepared by combining i) a bis(cyclopentadienyl) metal compound containing at least one ligand capable of reacting with a proton, ii) an activator component comprising a cation capable of donating a proton and a bulky, labile anion capable of stabilizing the metal cation formed as a result of reaction between the metal compound and the activator component, and iii) a catalyst support material. Similarly, WO-94/03506 described a supported ionic catalyst prepared by combining i) a monocyclopentadienyl metal compound, ii) a cationic activator component, and iii) a catalyst support material. Optionally, the supported ionic catalyst could be prepolymerized with an olefinic monomer. The support material could also be treated with a hydrolyzable organoadditive, preferably a Group 13 alkyl compound such as triethylaluminum. Such supported catalysts do not provide for chemically attaching any of the catalyst components to the support material, and accordingly, are unsuited for use in slurry polymerizations or other reactions where solvents or diluents are present which can remove catalysts from the support.

In U.S. Pat. No. 5,427,991, certain catalyst supports comprising polyanionic moieties constituted of noncoordinating anionic groups chemically bonded to crosslinked polymeric core components were disclosed. It is also well known to attach or bind alumoxanes to inert supports. Disadvantageously, binding of the cocatalyst to the support results in catalyst compositions having low productivity, likely due to inferior activation ability or activity of immobilized cocatalysts.

Supported metallocene catalysts wherein one or more delocalized moieties of the metallocene are chemically attached to polymeric organic or particulated inorganic materials, including silica, are known from U.S. Pat. Nos. 5,399,636, 5,587,439, 6,040,261, WO98/09913 and WO98/03521. Disadvantageously, preparing and using solid functionalized reagents for synthesis of metallocenes and similar organometal compounds using organometallic synthetic processes is prohibitively expensive and unsuited for use on an industrial scale. Moreover, such processes utilizing condensation reactions to tether a catalyst component also generate one or more by-products that can interfere with subsequent polymerizations. Moreover, similar chemistries based on diimine and/or diimine functionalized supports used to synthesize donor complexes with Group 3-10 metal compounds result in catalysts having inferior catalytic properties, due it is believed, to the presence of Lewis base functionality in close proximity to the metal catalyst center.

In US 2002/0082161, certain functionalized particulated supports containing diene or alkyne groups formed by reaction of trialkylaluminum treated silica with the corresponding diene or alkyne functionalized alcohols were disclosed. The compositions were used for preparing supported olefin polymerization catalysts by reaction with metal complexes containing substituents that were, "capable of reaction with the diene or alkyne functionality of the support". Examples included Group 3-10 metallocene and constrained geometry complexes having replaceable ligands. Disadvantageously, when the functionalized support comprises one of the donor ligands in the active catalyst, interference with the electronic environment of the metal cation or other catalytic species can occur. Moreover, if the tether is a single bond to the metal catalyst center, displacement of the solid phase ligand by an olefin during polymerization can destroy the tether, resulting in leaching of the catalyst and/or loss of catalyst activity in the presence of liquids, especially slurry diluents.

Certain resin bound 4-substituted 2-aminobutadiene supports prepared through a Wittig reaction with polymer supported 2-(N-piperazino)propyl-1-enyl-1-triphenylphosphonium bromide were disclosed in *Tetrahedron. Letters,* 38 (40), 7111-7114 (1997). The compositions were stated to be useful as resin bound dienes for solid phase [4+2]cycloaddition reactions.

The ability of certain polyvalent amine complexes of Group 4 metals to form ortho-metallated derivatives via in situ ligand exchange with adjacent aromatic-, particularly naphthalenyl-, functionality has been disclosed previously in US-A-2004/0220050. Additional references related generally to metal complexes based on polyvalent metal-centered, heteroaryl donor ligands include U.S. Pat. Nos. 6,103,657, 6,320,005, 6,653,417, 6,637,660, 6,906,160, 6,919,407, 6,927,256, 6,953,764, US-A-2002/0142912, US-A-2004/0220050, US-A-2004/0005984, EP-A-874,005, EP-A-791,609, WO 2000/20377, WO 2001/30860, WO 2001/46201, WO 2002/24331, WO 2002/38628, WO 2003/040195, WO 2004/94487, WO 2006/20624, and WO 2006/36748.

It would be desirable to provide a supported olefin polymerization catalyst and a polymerization process using the same that is capable of producing olefin polymers at good catalyst efficiencies in which the metal complex is covalently bound to the support, especially a particulated inorganic material. It would further be desirable to provide such a supported catalyst composition that is devoid of Lewis base groups adjacent to or attached to the metal center and that is adapted for use in a slurry and/or gas phase polymerization process while being relatively unaffected by the presence of condensed monomer and/or diluents. Finally, it would be desirable if there were provided a method for forming tethered, supported metal complexes from Group 4 metal complexes that do not entail preparation of solid compounds containing delocalized π-bound ligand groups or the use of condensation reactions of solid reagents in the synthesis.

SUMMARY OF THE INVENTION

In one aspect of the present invention, there is provided a supported metal complex comprising the reaction product of:

(A) a transition metal complex of a polyvalent heteroaryl donor ligand containing at least one ortho-metallated aromatic ligand group, and (B) an ethylenically or poly(ethylenically) functionalized particulated organic or inorganic solid.

Under the conditions of the present process, the transition metal complex readily inserts into one or more of the ethylenic unsaturations of the particulated solid, thereby creating a covalently bonded bridging group, especially an ethandiyl group, in place of the ortho-metal linkage. Beneficially, the foregoing process does not result in concomitant formation of byproducts that would interfere with the active catalyst species, as may occur during a condensation process, nor does it interfere with the active catalyst species because formation of the tether involves insertion of the ethylenic unsaturation into the metal-aryl group bond, creating a linkage to both the metal and the polyvalent ligand structure surrounding the metal. Subsequent activation of the metal complex does not alter the bond to the polyvalent heteroaryl ligand, especially polyvalent heteroaryl amide ligands, even if the bond to the metal is altered or eliminated due to activation. Moreover, the transition metal complex may be in the form of a cationic complex or other active species (preactivated) prior to tethering to the solid support.

In addition, there is provided a supported catalyst composition useful for the addition polymerization of addition polymerizable monomers, said composition comprising a transition metal complex of a polyvalent heteroaryl donor ligand, and a functionalized particulated organic or inorganic solid, wherein the transition metal complex is covalently bound to the particulated solid by means of addition of ethylenic functional groups of the solid to one or more ortho-metal-aryl bonds of the transition metal complex.

Although activation of the transition metal complex may occur before or after formation of the supported catalyst compositions of the invention, in preferred embodiments of both of the foregoing aspects of the invention, the metal complex is activated for polymerization by contact with an activator prior to combination with the ethylenically or poly (ethylenically) functionalized particulated solid support. More specifically, it is believed that the metal complex comprises a cation, ideally formed by combination of the metal complex with an activating cocatalyst prior to reaction with the ethylenically or poly(ethylenically) functionalized particulated solid support. Accordingly, in a desirable embodiment, the metal complex in its activated or cationic form retains at least one ortho-metal ligand bond capable of inserting an ethylene group of the functionalized particulated solid support.

In a further aspect, the invention provides a process for preparing an inorganic oxide support comprising pendant ethylenically unsaturated, preferably vinyl functional groups suitable for the preparation of supported metal complexes such as the foregoing, said process comprising combining an inorganic oxide material comprising Lewis acid functionalized surface hydroxyl groups with a protonated Lewis base substituted ethylenically unsaturated, preferably vinyl aliphatic compound. The resulting supports bearing vinyl substituted aliphatic functionality are especially effective in formation of tethered metal complexes having high and sustained catalytic activity. Highly desirably, the residual Lewis base functionality resulting from formation of the foregoing tethering groups is at least 2, preferably at least 4 and most preferably at least 6 carbons removed from the ethylenic unsaturation or pendant vinyl functionality.

In yet another aspect the invention provides an addition polymerization process wherein one or more addition polymerizable monomers are contacted under addition polymerization conditions with a supported catalyst composition according to the present invention or preparable according to the present invented process.

The supports and supported catalysts of the invention are readily prepared in high yields and efficiencies. Importantly, catalyst compositions according to the invention demonstrate improved performance as measured by catalyst activity and/ or product bulk density, compared to previously known supported catalyst compositions, especially under slurry polymerization conditions. This is believed to be a result of the ability to tether the metal complex to the surface of the inorganic oxide without generation of byproducts that can interfere with catalyst performance and without formation of donor electron containing functionality in close proximity to the transition metal.

DETAILED DESCRIPTION OF THE INVENTION

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups disclosed in, *Nomenclature of Inorganic Chemistry: Recommendations* 1990, G. J. Leigh, Editor, Blackwell Scientific Publications (1990). Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The term "heterocarbyl" refers to groups containing one or more carbon atoms and one or more heteroatoms and no hydrogen atoms. The bond between the carbon atom and any heteroatom as well as the bonds between any two heteroatoms, may be a single or multiple covalent bond or a coordinating or other donative bond. Examples include trichloromethyl-, perfluorophenyl-, cyano- and isocyanato-groups. The terms "heteroatom containing hydrocarbyl" or "heterohydrocarbyl" refer to univalent groups in which at least one atom other than hydrogen or carbon is present along with one or more carbon atom and one or more hydrogen atoms. Thus, an alkyl group substituted with a halo-, heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heterohydrocarbyl. Examples of suitable heteroalkyl groups include chloromethyl-, 2-cyanoethyl-, hydroxymethyl-, benzoylmethyl-, (2-pyridyl)methyl-, chlorobenzyl-, and trifluoromethyl-groups.

As used herein the term "aromatic" refers to a polyatomic, cyclic, conjugated ring system containing $(4\delta+2)$ π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, alkenyl, substituted alkyl, substituted alkenyl, cycloalkyl, substituted cycloalkyl, heterocycloalkyl, substituted heterocycloalkyl, halo, haloalkyl (for example, $CF_3$), hydroxy, amino, phosphido, alkoxy, amino, thio, nitro, and both saturated and unsaturated hydrocarbylene groups, including those which are fused to the aromatic ring(s), linked covalently or linked to a common group such as a methylene or ethylene moiety. The common linking group may also be carbonyl as in benzophenone-, oxygen as in diphenylether- or nitrogen as in diphenylamine-groups.

"Ethylenic unsaturation" or "ethylenic group" refers to adjacent aliphatic carbon atoms bound together by double bonds (non-aromatic $sp^2$ electronic hybridization), preferably of the formula: —CR*=CR*—, or —CR*=CR*$_2$, where R* independently each occurrence is hydrogen, halo, nitrile, hydrocarbyl, or substituted hydrocarbyl containing up to 20 atoms not counting hydrogen. Percent ethylenic unsaturation as used herein is calculated based on total carbon-carbon bond content of the polymer. The term "pendant" refers to groups or substituents attached to secondary or tertiary substituted carbons of the polymer. The term "terminal" refers to groups or substituents attached to a primary carbon of the polymer. Terminal ethylenic unsaturation is referred to interchangeably herein as "vinyl" unsaturation.

The term "polymer" as used herein refers to a macromolecular compound comprising multiple repeating units and a molecular weight of at least 100, preferably at least 1000. Preferably, at least one repeating unit occurs, consecutively or non-consecutively, 6 or more times, more preferably 20 or more times, on average. Molecules containing less than 6 such repeating units on average are referred to herein as oligomers. The term includes homopolymers, copolymers, terpolymers, interpolymers, and so on. The term "interpolymer" is used herein interchangeably with the term copolymer to refer to polymers incorporating in polymerized form at least two differentiated repeating units, usually obtained from separate copolymerizable monomers. The least prevalent monomer in the resulting copolymer or interpolymer is generally referred to by the term "comonomer".

The term "fugitive" as used herein refers to ligands of a metal complex that are subject to loss under conditions of activation or polymerization. In particular, fugitive ligands are leaving groups, that form an active catalyst species, especially a cation, through reaction with a Lewis acid. Surprisingly, it has been found that using the unique combination of supported catalyst compositions or supports as specified herein, the activated transition metal catalysts can be employed to produce olefin polymers at extremely high catalyst efficiencies. Preferably the catalysts attain efficiencies of at least $1\times10^5$ g polymer/g transition metal, more preferably at least $1\times10^6$ g polymer/g transition metal. Moreover, these supported catalysts are highly immune to leaching under typical process conditions employed in gas phase or, especially, slurry polymerizations, and the tethering ligand formed by insertion of ethylenic unsaturation into the ortho-metallated ligand, is not fugitive.

Additional benefits in the use of the present supported catalysts in polymerization processes include the fact that the formation of polymer deposits on reactor walls and other moving parts in the reactor (due to leaching of catalyst from the support) is avoided and therefore polymers having improved bulk density are obtained in particle forming polymerization processes having improved reliability and operability. According to the present invention, improved bulk densities for ethylene containing homopolymers and interpolymers are bulk densities of at least $0.20$ g/cm$^3$, and preferably of at least $0.25$ g/cm$^3$.

Suitable particulated supports for use in the present invention include inorganic oxide supports, especially highly porous silicas, aluminas, aluminosilicates, aluminophosphates, clays, titanias, and mixtures thereof. Suitable organic solids include natural and synthetic resins, including polyethylene, polypropylene, polyesters, polyvinylalcohols, and polyvinylaromatic polymers. Preferred particulated supports are inorganic oxides especially alumina and silica. The most preferred support material is silica. The support material may be in granular, agglomerated, pelletized, or any other physical form. Preferred supports have a surface area as determined by nitrogen porosimetry using the B.E.T. method from 10 to 1000 m$^2$/g, and preferably from 100 to 600 m$^2$/g. The pore volume of the support, as determined by nitrogen adsorption, advantageously is between 0.1 and 3 cm$^3$/g, preferably from 0.2 to 2 cm$^3$/g. The average particle size is not critical but typically is from 0.5 to 500 μm, preferably from 1 to 150 μm.

Inorganic oxides, especially silica, alumina and aluminosilicates are known to inherently possess small quantities of hydroxyl functionality attached to the atomic matrix. When used to prepare the present supports and supported metal complexes, these materials are preferably first subjected to a heat treatment followed by treatment with a Lewis acid to reduce the surface hydroxyl content thereof to less than 10 mmol/g, more preferably less than 1.0 mmol/g, most preferably, less than 0.8 mmol/g. Typical heat treatments (calcining) are carried out at a temperature from 150 to 900° C., preferably 200 to 850° C. for a duration of 10 minutes to 50 hours. Lewis acid treatments include contacting with Lewis acid alkylating agents such as trihydrocarbyl aluminum compounds, trihydrocarbylchlorosilane compounds, trihydrocarbylalkoxysilane compounds, or similar agents. Residual hydroxyl functionality can be detected by the technique of Fourier Transform Infrared Spectroscopy (DRIFTS IR) as disclosed in Fourier Transform Infrared Spectroscopy, P. Griffiths & J. de Haseth, 83 *Chemical Analysis*, Wiley Interscience (1986), p. 544.

The inorganic oxide may be unfunctionalized excepting for conversion of surface hydroxyl groups as previously disclosed. The inorganic oxide may also be functionalized by treating with a silane, hydrocarbyloxysilane, chlorosilane, borane, or other functionalizing agent to attach thereto pendant functionality for later modification purposes, if desired. Suitable functionalizing agents are compounds that react with available surface hydroxyl groups of the inorganic oxide or react with the metal or metalloid atoms of the inorganic oxide matrix. Examples of suitable functionalizing agents include phenylsilane, diphenylsilane, methylphenylsilane, dimethylsilane, diethylsilane, diethoxysilane, and chlorodimethylsilane, etc. Techniques for forming such functionalized inorganic oxide compounds were previously disclosed in U.S. Pat. Nos. 3,687,920 and 3,879,368.

In a preferred embodiment the inorganic oxide is unfunctionalized excepting for the presence of Lewis acid functional groups capable of reaction as disclosed herein. Preferably, the Lewis acid groups are incorporated by reaction between a tri($C_{1-4}$ alkyl) aluminum compound, especially trimethyl aluminum, with surface hydroxyl moieties of the inorganic oxide. The reaction is occasioned by contacting the tri($C_{1-4}$) alkyl aluminum compound with the inorganic oxide material, optionally in the presence of a hydrocarbon diluent, further optionally in the presence of a base assist, such as a $C_{1-4}$ trialkylamine. The reaction is conducted at a temperature from 0 to 110° C., preferably from 20 to 50° C. Generally an excess of Lewis acid compound is employed based on hydroxyl content of the particulated solid. Preferred ratios of Lewis acid: particulated solid are from 1 to 2500 mmol/g. As a result of the foregoing reaction, residual hydroxyl functionality of the inorganic oxide is reduced or further reduced to the previously mentioned desired, more desired or most desired levels. Highly preferably in preparing the present functionalized support materials, a calcined silica is employed having initial (that is, prefunctionalized) residual hydroxyl content less than 1.0 mmol/g, and from 1 to 20 mmol of Lewis acid functionalizing agent/g silica is employed. The molar ratio of base assist, if any, employed to Lewis acid functionalizing agent is generally from 0.0:1 to 2.0:1. Unreacted functionalizing agent is preferably removed from the surface of the inorganic oxide, for example, by washing with a liquid hydrocarbon, and the support is thoroughly dried prior to use in preparing the functionalized supports of the present invention.

The functionalized support, supported metal complex, or the supported catalyst composition may also be treated with an aluminum component selected from an alumoxane or a trialkylaluminum modified alumoxane, according to techniques known in the art in order to remove or scavenge catalyst poisons. Preferably, the aluminum component is selected from the group consisting of aluminoxanes and tri($C_{1-4}$ hydrocarbyl)aluminum modified alumoxane compounds. Most preferred aluminum components are methalumoxane, triisobutylaluminum modified methalumoxane, and mixtures thereof. The scavenger may also be added to the polymerization mixture in a reactor in which the present supported catalyst composition is employed. Alternatively, the alumoxane may serve as some or all of the activating cocatalyst in the resulting supported activated catalyst composition.

Alumoxanes (also referred to as aluminoxanes) are oligomeric or polymeric aluminum oxy compounds containing chains of alternating aluminum and oxygen atoms, whereby the aluminum carries a substituent, preferably an alkyl group. The structure of alumoxane is believed to be represented by the following general formulae (—Al(R)—O—)$_m$, for a cyclic alumoxane, and $R_2$Al—O(—Al(R)—O)$_m$—Al$R_2$, for a linear compound, wherein R is $C_{1-4}$ alkyl, and m is an integer ranging from 1 to 50, preferably at least 4. Alumoxanes are typically the reaction products of water and an aluminum alkyl, which in addition to an alkyl group may contain halide or alkoxide groups. Reacting several different aluminum alkyl compounds, such as for example trimethyl aluminum and tri-isobutyl aluminum, with water yields so-called modified or mixed alumoxanes. Preferred alumoxanes are methylalumoxane and methylalumoxane modified with minor amounts of $C_{2-4}$ alkyl groups, especially isobutyl groups. Alumoxanes generally contain minor to substantial amounts of starting aluminum alkyl compound.

Particular techniques for the preparation of alumoxane type compounds by contacting an aluminum alkyl compound with an inorganic salt containing water of crystallization are disclosed in U.S. Pat. No. 4,542,119. In a particular preferred embodiment an aluminum alkyl compound is contacted with a regeneratable water-containing substance such as hydrated alumina, silica or other substance. This is disclosed in EP-A-338,044. Thus the alumoxane may be incorporated into the support by reaction of a hydrated alumina or silica material, which has optionally been functionalized with silane, siloxane, hydrocarbyloxysilane, or chlorosilane groups, with a tri($C_{1-10}$ alkyl) aluminum compound according to known techniques.

Conversion of surface hydroxyl groups of the particulated support is accomplished by reaction of Lewis acid functionality, especially alkylaluminum functionality, with an ethylenically unsaturated compound containing protonated Lewis base functionality, especially a hydroxyl, thiol, hydrocarbylamine, di(hydrocarbyl)amine, hydrocarbylphosphine, or di(hydrocarbyl)-phosphine functionalized compound containing vinyl functionality. Especially preferred reagents are ethylenically or polyethylenically unsaturated primary aliphatic alcohols, thiols, hydrocarbylamines, di(hydrocarbyl) amines, hydrocarbylphosphines, or di(hydrocarbyl)-phosphines containing from 3 to 20 carbons, especially those containing terminal ethylenic unsaturation.

Addition of oxyalkyldiene functionality to alkylaluminum treated silica has been previously disclosed in US-A-2002/0082161. The addition of aminoalkyldiene functionality to polymer substrates has been previously taught in *Tetrahedron Letters*, 38 (40), 7111-7114 (1997). Either of these techniques or variations thereof may be employed to prepare poly(ethylenically) unsaturation in tethers usefully employed according to the present invention. However, preferred reagents are vinyl substituted aliphatic ω-alcohols, having from 5 to 20 carbons, preferably from 7 to 20 carbons. Examples include ω-octene-1-ol, ω-nonene-1-ol, ω-decene-1-ol, ω-undecene-1-ol, ω-dodecene-1-ol, and ω-octadecene-1-ol.

Suitable transition metal complexes for use herein include any transition metal complex containing a bond from the transition metal to an adjacent aromatic ring in a position ortho- to another external bond to the aryl ligand, and into which an ethylenic group may be inserted. Examples include, but are not limited to, Group 4 metal derivatives, especially hafnium derivatives, of hydrocarbylamine substituted heteroaryl compounds corresponding to the formula:

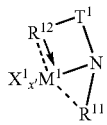

wherein:

$R^{11}$ is a hydrocarbyl or heterohydrocarbyl group containing up to 30 atoms not counting hydrogen;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group;

$R^{12}$ is a substituted heteroaryl group containing Lewis base functionality of up to 20 atoms, not counting hydrogen, and comprising a aryl or heteroaryl group or a divalent derivative thereof, especially a substituted pyridinyl- or substituted imidazolyl-group, or a divalent derivative thereof;

$M^1$ is a Group 4 metal, preferably zirconium or hafnium, most preferably hafnium;

$X^1$ is an anionic, neutral or dianionic ligand group;

x' is a number from 0 to 5 indicating the number of such $X^1$ groups; and bonds and electron donative interactions are represented by lines and arrows respectively, and ortho-metal bonds between $R^{12}$ and $M^1$, and optionally between $R^{11}$ and $M^1$, are indicated by dotted lines.

Preferred metal complexes correspond to the formula:

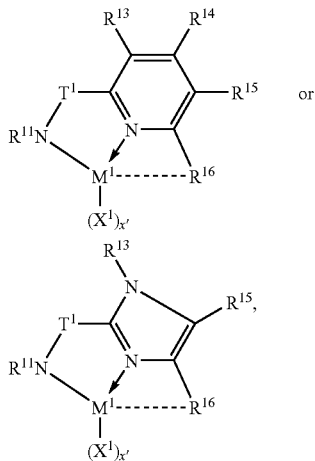

wherein $M^1$, $X^1$, x', $R^{11}$ and $T^1$ are as previously defined, $R^{13}$, $R^{14}$, and $R^{15}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, or $R^{15}$ groups may be joined together thereby forming fused ring derivatives, $R^{16}$ is an aryl group or substituted aryl group, bonds and electron pair donative interactions are represented by lines and arrows respectively, and ortho-metal ligand interactions between $M^1$ and $R^{16}$ are indicated by dotted lines.

More preferred examples of the foregoing metal complexes correspond to the formula:

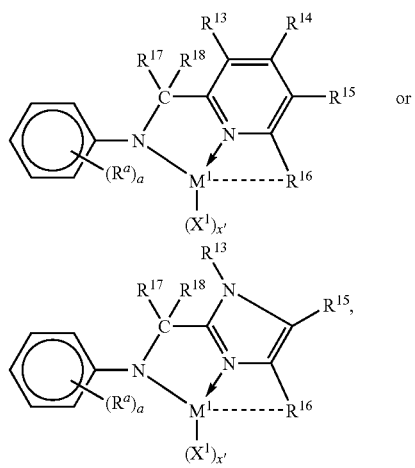

wherein $M^1$, $X^1$, and x' are as previously defined, $R^{13}$, $R^{14}$, and $R^{15}$ are as previously defined, preferably $R^{13}$, $R^{14}$, and $R^{15}$ are hydrogen, or $C_{1-4}$ alkyl, and $R^{16}$ is $C_{6-20}$ aryl, most preferably 2-naphthalenyl, also bonded to $M^1$ via an ortho-metal bond;

$R^a$ independently each occurrence is $C_{1-4}$ alkyl, and a is 1-5, most preferably $R^a$ in two ortho-positions to the nitrogen is isopropyl or t-butyl;

$R^{17}$ and $R^{18}$ independently each occurrence are hydrogen, halogen, or a $C_{1-20}$ alkyl or aryl group, most preferably one of $R^{17}$ and $R^{18}$ is hydrogen and the other is a $C_{6-20}$ aryl group, especially 2-isopropyl, phenyl or a fused polycyclic aryl group, most preferably an anthracenyl group, and bonds and electron pair donative interactions are represented by lines and arrows respectively, and ortho-metal ligand interactions are indicated by dotted lines.

Highly preferred polyfunctional, ortho-metallated, amine metal complexes for use herein correspond to the formula:

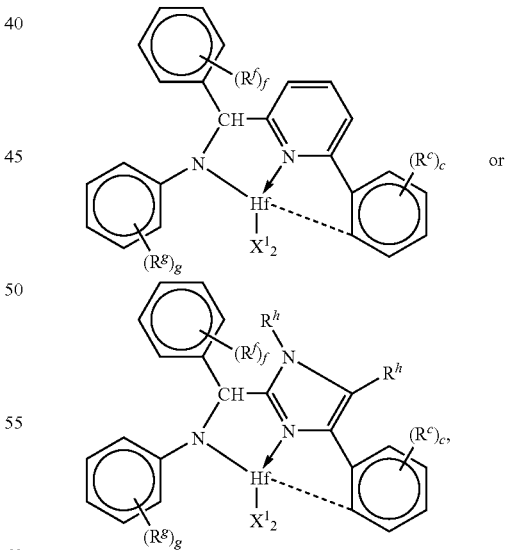

wherein $X^1$ each occurrence is halide, N,N-dimethylamido, $C_{1-4}$ alkyl, or $C_{6-10}$ aralkyl, and preferably each occurrence $X^1$ is methyl;

$R^c$, $R^f$ and $R^g$ independently each occurrence are halogen, $C_{1-20}$ alkyl, or $C_{6-20}$ aryl, or two adjacent $R^c$, $R^f$ or $R^g$ groups are joined together thereby forming a ring, c is and integer from 1 to 4, and f and g, independently are integers from 1-5;

$R^h$ independently each occurrence is hydrogen or $C_{1-6}$ alkyl;

bonds and electron pair donative interactions are represented by lines and arrows respectively and ortho-metal ligand interactions are indicated by dotted lines.

Most highly preferred examples of such polyvalent, ortho-metallated, amine donor metal complexes are compounds of the formulas:

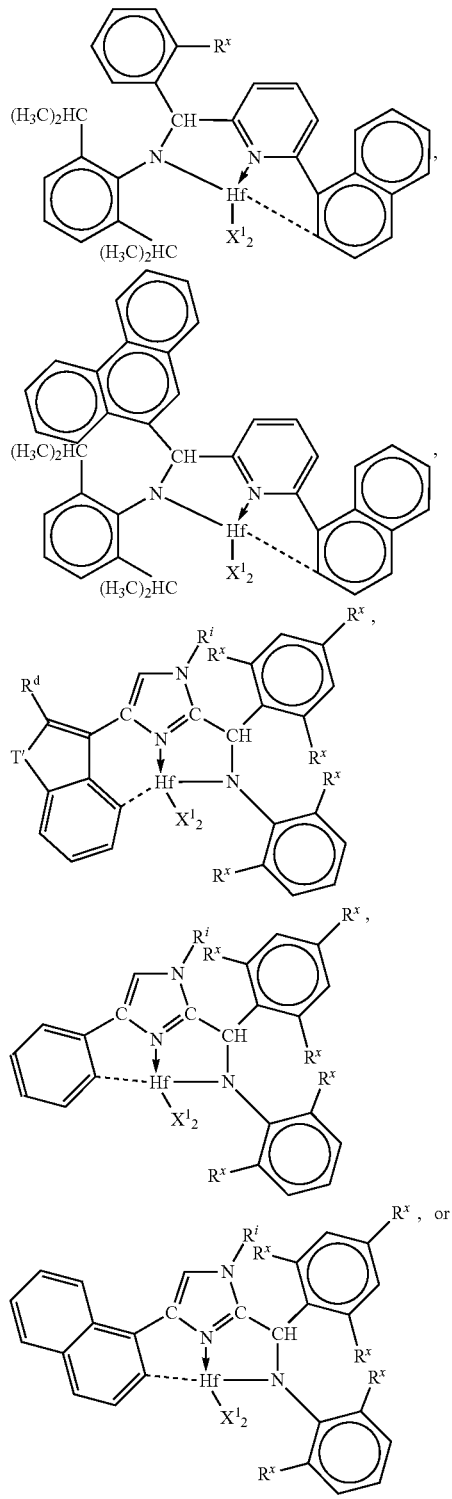

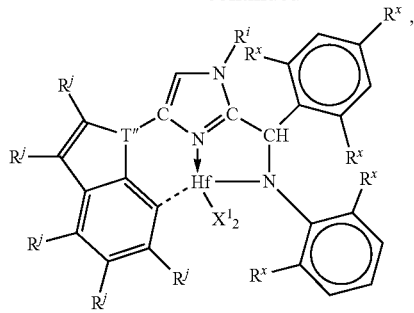

wherein, $R^d$ is hydrogen or $C_{1-6}$ alkyl, most preferably ethyl;

$R^i$ is methyl or isopropyl;

$R^j$ is hydrogen, $C_{1-6}$ alkyl or cycloalkyl, or two adjacent $R^6$ groups together form a fused aromatic ring, preferably two $R^6$ groups together on the 5-membered ring form a benzo-substituent;

$R^x$ is $C_{1-4}$ alkyl or cycloalkyl, preferably methyl, isopropyl, t-butyl or cyclohexyl;

$X^1$ each occurrence is halide, N,N-dimethylamido, or $C_{1-4}$ alkyl, preferably methyl, bonds and electron pair donative interactions are represented by lines and arrows respectively and ortho-metal ligand interactions are indicated by dotted lines.

Examples of the foregoing ortho-metallated complexes include:

[N-[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$,κ$N^2$]hafnium dimethyl,

[N-[2,6-bis(1-methylethyl)phenyl]-α-[2-(1-methylethyl)phenyl]-6-(1,2-naphthalenyl-κ-$C^2$)-2-pyridinemethanaminato (2-)-κ$N^1$,κ$N^2$]hafnium di(n-butyl);

[N-[2,6-bis(1-methylethyl)phenyl]-α-[2,6-bis(1-methylethyl)phenyl]-6-(1,2-naphthalendiyl-κ-$C^2$)-2-pyridinemethanaminato (2-)-κ$N^1$,κ$N^2$]hafnium dimethyl,

[N-[2,6-bis(1-methylethyl)phenyl]-α-[2,6-bis(1-methylethyl)phenyl]-6-(1,2-naphthalenyl-κ-$C^2$)-2-pyridinemethanaminato (2-)-κ$N^1$,κ$N^2$]hafnium di(n-butyl)

[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$,κ$N^2$] hafnium dimethyl,

[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$,κ$N^2$] hafnium di(n-butyl),

[N-[2,4,6-tris(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$,κ$N^2$] hafnium di(methyl), and

[N-[2,4,6-tris(1-methylethyl)phenyl]-α-[2,6-bis(1-methylethyl)phenyl]-6-(1,2-naphthalenyl-κ-$C^2$)-2-pyridinemethanaminato (2-)-κ$N^1$,κ$N^2$]hafnium di(n-butyl).

The supported metal complexes according to the invention may be activated in various ways to yield catalyst compounds having a vacant coordination site that will coordinate, insert, and polymerize addition polymerizable monomers, especially olefin(s). Both activated and unactivated or neutral metal complexes are included in the present invention. For the purposes of this patent specification and appended claims, the term "activator" or "cocatalyst" is defined to be any compound or component or method which can convert any of the catalyst compounds of the invention into addition polymerization catalysts. Non-limiting examples of suitable activators include Lewis acids, non-coordinating ionic activators, ionizing activators, organometal compounds, and combinations of the foregoing substances that can convert a neutral catalyst compound to a catalytically active species.

It is believed, without desiring to be bound by such belief, that in one embodiment of the invention, catalyst activation may involve formation of a cationic, partially cationic, or zwitterionic species, by means of proton transfer, oxidation, or other suitable activation process. It is to be understood that the present invention is operable and fully enabled regardless of whether or not such an identifiable cationic, partially cationic, or zwitterionic species actually results during the activation process, also interchangeably referred to herein as an "ionization" process or "ionic activation process".

The corresponding cationic derivatives of the foregoing illustrative metal complexes bear a positive charge localized on the transition metal, one less $X^1$ group bound to the transition metal, and an associated, preferably non-coordinating, anion, derived from the activator by abstraction of an $X^1$ group, oxidation of the transition metal, or disassociation of the activator.

One suitable class of organometal activator or cocatalyst is an alumoxane, also referred to as alkylaluminoxane. Alumoxanes are well known Lewis acid activators for use with metallocene type catalyst compounds to prepare addition polymerization catalysts. There are a variety of methods for preparing alumoxanes and modified alumoxanes, non-limiting examples of which are described in U.S. Pat. Nos. 4,665,208, 4,952,540, 5,091,352, 5,206,199, 5,204,419, 4,874,734, 4,924, 018, 4,908,463, 4,968,827, 5,308,815, 5,329,032, 5,248,801, 5,235,081, 5, 157,137, 5,103,031, 5,391,793, 5,391,529, 5,693,838, 5,731,253, 5,731,451 5,744,656; European publications EP-A-561476, EP-A-279586 and EP-A-594218; and PCT publication WO 94/10180. Preferred alumoxanes are tri($C_{3-6}$)alkylaluminum modified methylalumoxane, especially tri(isobutyl)aluminum modified methalumoxane, available commercially as MMAO-3A or tri(n-octyl)aluminum modified methalumoxane, available commercially as MMAO-12, from Akzo Nobel, Inc.

It is within the scope of this invention to use alumoxane(s) or modified alumoxane(s) as an activator or as a tertiary component in the invented process. That is, the compound may be used alone or in combination with other activators, neutral or ionic, such as tri(alkyl)ammonium tetrakis(pentafluorophenyl)borate, trisperfluoroaryl compounds, polyhalogenated heteroborane anions (WO 98/43983), and combinations thereof. When used as a tertiary component, the amount of alumoxane employed is generally less than that necessary to effectively activate the metal complex when employed alone. In this embodiment, it is believed, without wishing to be bound by such belief, that the alumoxane does not contribute significantly to actual catalyst formation or activation. Not withstanding the foregoing, it is to be understood that some participation of the alumoxane in the activation process is not necessarily excluded.

Ionizing cocatalysts may contain an active proton, or some other cation associated with, but not coordinated to or only loosely coordinated to, an anion of the ionizing compound. Such compounds are described in European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124. Preferred among the foregoing activators are ammonium cation containing salts, especially those containing trihydrocarbyl-substituted ammonium cations containing one or two $C_{10-40}$ alkyl groups, especially methylbis(octadecyl)ammonium- and methylbis(tetradecyl)-ammonium-cations and a non-coordinating anion, especially a tetrakis(perfluoro)arylborate anion, especially tetrakis (pentafluorophenyl)borate. It is further understood that the cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo-Nobel under the trade name Armeen™ M2HT. A most preferred ammonium salt activator is methyldi($C_{14-20}$alkyl)ammonium tetrakis(pentafluorophenyl)borate.

Activation methods using ionizing ionic compounds not containing an active proton but capable of forming active catalyst compositions by oxidative or other process, especially, ferrocenium salts of the foregoing non-coordinating anions are also contemplated for use herein, and are described in EP-A-426637, EP-A-573403 and U.S. Pat. No. 5,387,568.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

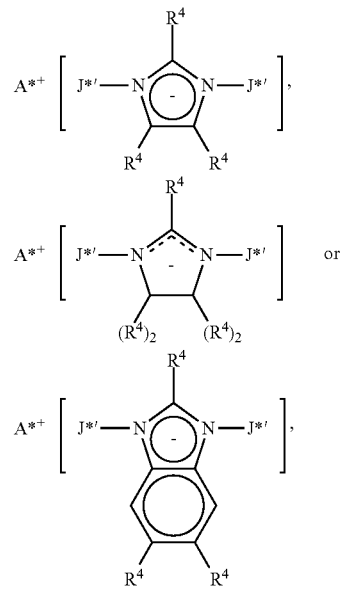

wherein:
$A^{*+}$ is a cation, especially a proton containing cation, and preferably is a trihydrocarbyl ammonium cation containing one or two $C_{10-40}$ alkyl groups, especially a methyldi($C_{14-20}$ alkyl)ammonium-cation, $R^4$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $J^{*'}$ is tris(pentafluorophenyl)borane or tris(pentafluorophenyl)alumane).

Examples of these catalyst activators include trihydrocarbylammonium-salts, especially, methyldi($C_{14-20}$alkyl)ammonium-salts of: bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecyl)imidazolide, bis(tris(pentafluorophenyl)borane)imidazolinide, bis(tris(pentafluorophenyl)borane)-2-undecylimidazolinide, bis(tris(pentafluorophenyl)borane)-2-heptadecylimidazolinide, bis(tris(pentafluorophenyl)borane)-4,5-bis(undecyl)imidazolinide, bis(tris(pentafluorophenyl)borane)-4,5-bis(heptadecyl)imidazolinide, bis(tris(pentafluorophenyl)borane)-5,6-dimethylbenzimidazolide, bis(tris(pentafluorophenyl)borane)-5,6-bis(undecyl)benzimidazolide, bis(tris(pentafluorophenyl)alumane)imidazolide, bis(tris(pentafluorophenyl)alumane)-2-undecylimidazolide, bis(tris(pentafluorophenyl)alumane)-2-heptadecylimidazolide, bis(tris(pentafluorophenyl)alumane)-4,5-bis(undecyl)imidazolide, bis(tris(pentafluorophenyl)alumane)-4,5-bis(heptadecyl)imidazolide, bis(tris(pentafluorophenyl)alumane)imidazolinide, bis(tris(pentafluorophenyl)alumane)-2-undecylimidazolinide, bis(tris(pentafluorophenyl)alumane)-2-heptadecylimidazolinide, bis(tris(pentafluorophenyl)alumane)-4,5-bis(undecyl)imidazolinide, bis(tris(pentafluorophenyl)alumane)-4,5-bis(heptadecyl)imidazolinide, bis(tris(pentafluorophenyl)alumane)-5,6-dimethylbenzimidazolide, and bis(tris(pentafluorophenyl)alumane)-5,6-bis(undecyl)benzimidazolide.

Other activators include those described in PCT publication WO 98/07515 such as tris(2,2',2"-nonafluorobiphenyl)fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. EP-A-781299 describes using a silylium salt in combination with a non-coordinating compatible anion. Other activators or methods for activating a catalyst compound are described in for example, U.S. Pat. Nos. 5,849,852, 5,859,653, 5,869,723, EP-A-615981, and PCT publication WO 98/32775.

It is also within the scope of this invention that the above described supported metal complex compositions can be combined with more than one of the activators or activation methods described above. The mole ratio of the activator component(s) to the metal complex in the catalyst compositions of the invention suitably is in the range of between 0.3:1 to 2000:1, preferably 1:1 to 800:1, and most preferably 1:1 to 500:1. Where the activator is an ionizing activator such as those based on the anion tetrakis(pentafluorophenyl)boron or the strong Lewis acid trispentafluorophenylboron, the mole ratio of the metal or metalloid of the activator component to the metal complex is preferably in the range of between 0.3:1 to 3:1.

Tertiary Components

In addition to the supported activated transition metal complex, it is contemplated that certain tertiary components or mixtures thereof may be incorporated in the supported catalyst composition or in the polymerization mixture in order to obtain improved catalyst performance or other benefit. Examples of such tertiary components include scavengers designed to react with contaminants in the reaction mixture to prevent catalyst deactivation. Suitable tertiary components may also activate or assist in activation of one or more of the metal complexes employed in the catalyst composition or act as chain transfer agents. As previously noted, such tertiary component may also be one component of the supported tethered metal complex composition.

Examples include Lewis acids, such as trialkylaluminum compounds, dialkylzinc compounds, dialkylaluminumalkoxides, dialkylaluminumaryloxides, dialkylaluminum N,N-dialkylamides, di(trialkylsilyl)aluminum N,N-dialkylamides, dialkylaluminum N,N-di(trialkylsilyl)amides, alkylaluminumdialkoxides, alkylaluminum di(N,N-dialkylamides), tri(alkyl)silylaluminum N,N-dialkylamides, alkylaluminum N,N-di(trialkylsilyl)amides, alkylaluminum diaryloxides, alkylaluminum-bridged bis(amides) such as bis(ethylaluminum)-1-phenylene-2-(phenyl)amido-bis(diphenylamide), and/or alumoxanes; as well as Lewis bases, such as organic ether, polyether, amine, and polyamine compounds. Many of the foregoing compounds and their use in polymerizations are disclosed in U.S. Pat. Nos. 5,712,352 and 5,763,543, and in WO 96/08520. Preferred examples of the foregoing tertiary components include trialkylaluminum compounds, dialkylaluminum aryloxides, alkylaluminum diaryloxides, dialkylaluminum amides, alkylaluminum diamides, dialkylaluminum tri(hydrocarbylsilyl)amides, alkylaluminum bis(tri(hydrocarbylsilyl)amides), alumoxanes, and modified alumoxanes. Highly preferred tertiary components are alumoxanes, modified alumoxanes, or compounds corresponding to the formula $R^e{}_2Al(OR^f)$ or $R^e{}_2Al(NR^g{}_2)$ wherein $R^e$ is $C_{1-20}$ alkyl, $R^f$ independently each occurrence is $C_{6-20}$ aryl, preferably phenyl or 2,6-di-t-butyl-4-methylphenyl, and $R^g$ is $C_{1-4}$ alkyl or tri($C_{1-4}$alkyl)silyl, preferably trimethylsilyl. Most highly preferred tertiary components include methylalumoxane, tri(isobutylaluminum)-modified methylalumoxane, di(n-octyl)aluminum 2,6-di-t-butyl-4-methylphenoxide, and di(2-methylpropyl)aluminum N,N-bis(trimethylsilyl)amide.

Another example of a suitable tertiary component is a hydroxycarboxylate metal salt, by which is meant any hydroxy-substituted, mono-, di- or tri-carboxylic acid salt wherein the metal portion is a cationic derivative of a metal from Groups 1-13 of the Periodic Table of Elements. This compound may be used to improve polymer morphology especially in a gas phase polymerization. Non-limiting examples include saturated, unsaturated, aliphatic, aromatic or saturated cyclic, substituted carboxylic acid salts where the carboxylate ligand has from one to three hydroxy substituents and from 1 to 24 carbon atoms. Examples include hydroxyacetate, hydroxypropionate, hydroxybutyrate, hydroxyvalerate, hydroxypivalate, hydroxycaproate, hydroxycaprylate, hydroxyheptanate, hydroxypelargonate, hydroxyundecanoate, hydroxyoleate, hydroxyoctoate, hydroxyalmitate, hydroxymyristate, hydroxymargarate, hydroxystearate, hydroxyarachate and hydroxytercosanoate. Non-limiting examples of the metal portion includes a metal selected from the group consisting of Al, Mg, Ca, Sr, Sn, Ti, V, Ba, Zn, Cd, Hg, Mn, Fe, Co, Ni, Pd, Li and Na. Preferred metal salts are zinc salts.

In one embodiment, the hydroxycarboxylate metal salt is represented by the following general formula:

$M(Q)_x(OOCR)_y$, where

M is a metal from Groups 1 to 16 and the Lanthanide and Actinide series, preferably from Groups 1 to 7 and 12 to 16, more preferably from Groups 3 to 7 and 12 to 14, even more preferably Group 12, and most preferably Zn;

Q is halogen, hydrogen, hydroxide, or an alkyl, alkoxy, aryloxy, siloxy, silane, sulfonate or siloxane group of up to 20 atoms not counting hydrogen;

R is a hydrocarbyl radical having from 1 to 50 carbon atoms, preferably 1 to 20 carbon atoms, and optionally substituted with one or more hydroxy, alkoxy, N,N-dihydrocarbylamino, or halo groups, with the proviso that in one occurrence R is substituted with a hydroxy- or N,N-dihydrocarbylamino-group, preferably a hydroxy-group that is coordinated to the metal, M by means of unshared electrons thereof;

x is an integer from 0 to 3;

y is an integer from 1 to 4.

In a preferred embodiment M is Zn, x is 0 and y is 2.

Preferred examples of the foregoing hydroxycarboxylate metal salts include compounds of the formulas:

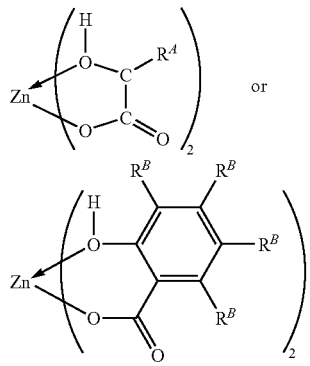

wherein $R^A$ and $R^B$ independently each occurrence are hydrogen, halogen, or $C_{1-6}$ alkyl.

Other additives may be incorporated into the catalyst compositions or employed simultaneously in the polymerization reaction for one or more beneficial purposes. Examples of additives that are known in the art include metal salts of fatty acids, such as aluminum, zinc, calcium, titanium or magnesium mono, di- and tri-stearates, octoates, oleates and cyclohexylbutyrates. Examples of such additives include Aluminum Stearate #18, Aluminum Stearate #22, Aluminum Stearate #132 and Aluminum Stearate EA Food Grade, all of which are available from Chemtura Corp. The use of such additives in a catalyst composition is disclosed in U.S. Pat. No. 6,306,984.

Additional suitable additives include antistatic agents such as fatty amines, for example, AS 990 ethoxylated stearyl amine, AS 990/2 zinc additive, a blend of ethoxylated stearyl amine and zinc stearate, or AS 990/3, a blend of ethoxylated stearyl amine, zinc stearate, and octadecyl-3,5-di-tert-butyl-4-hydroxyhydrocinnamate, also available from Chemtura Corp.

The above described tertiary compounds may be combined with the support, if desired, or added to the reaction mixture as separate components. Highly desirably, the tertiary component or components are present in a supported form, for example deposited on, contacted with, or incorporated within the present supported tethered catalyst compositions.

The supported catalyst of the present invention generally comprises from 0.001 to 10 mmol of transition metal complex per gram of particulated solid, preferably from 0.01 to 1 mmol/g. At higher loadings of transition metal complex, the support becomes too expensive. At too low amounts the catalyst efficiency of the resulting supported catalyst is unacceptable.

The support of the present invention can be stored or shipped under inert conditions as such or slurried in an inert diluent, such as alkane or aromatic hydrocarbons. If not already in cationic form, it may be used to generate the active supported catalyst by contacting with a suitable cocatalyst or activator compound optionally in the presence of a liquid diluent.

Generally, the ratio of moles of activator compound to moles of transition metal compound in the supported catalyst is from 0.5:1 to 1000:1, preferably from 0.8:1 to 500:1 and most preferably from 1:1 to 100:1. Certain cation forming initiators containing non-coordinating anions may be employed at much lower levels, specifically 0.5:1 to 100:1, preferably from 0.8:1 to 10:1 and most preferably from 1:1 to 2:1, based on metal complex. At too low ratios the supported catalyst will not be very active, whereas at too high ratios the catalyst cost becomes excessive due to the relatively large quantities of activator compound utilized.

The supported metal complex and or catalyst of the present invention can be prepared by combining the particulated solid support, transition metal complex, and optional activator compound in any order. In one embodiment, the supported, unactivated, transition metal complex is treated with a solution of the activator compound by combining the two components in a suitable liquid diluent, such as an aliphatic or aromatic hydrocarbon to form a slurry. Alternatively, the activator solution may be added to a fluidized or agitated bed comprising particles of supported, unactivated, metal complex in a quantity less than an amount to cause slurry formation, desirably in an amount approximately equal to total pore volume of the support. In another embodiment, the metal complex is activated first by contact with the activator compound to form a solution and the solution is added to the functionalized support using any quantity of solution. The temperature, pressure, and contact time for this treatment are not critical, but generally can vary from −20° C. to 150° C., from 1 Pa to 10,000 MPa, more preferably at atmospheric pressure (100 kPa), for 5 minutes to 48 hours.

Before using the supported catalyst of the invention, excess diluent or solvent, if any, may be removed to obtain a free flowing powder. This is preferably done by applying a technique which only removes the liquid and leaves the resulting solid, such as by applying heat, reduced pressure drying, evaporation, or a combination thereof. Alternatively, a suspension or dispersion of the supported catalyst in a nonsolvent, such as mineral oil, hydrogenated diesel fuel, kerosene, or other hydrocarbon liquid may also be prepared, especially for use in a slurry polymerization. All steps in the present process should be conducted in the absence of oxygen and moisture. The resulting supported catalyst may be stored or shipped under inert conditions or employed substantially simultaneously with its manufacture.

The supported, activated, metal complexes of the present invention may be used in addition polymerization processes wherein one or more addition polymerizable monomers are contacted with the supported catalyst of the invention under addition polymerization conditions. Either gas phase slurry polymerization conditions may be employed, or combination of such conditions in multiple reactors.

Suitable addition polymerizable monomers include ethylenically unsaturated monomers, acetylenic compounds, conjugated or non-conjugated dienes, and polyenes. Preferred monomers include olefins and diolefins, for examples alpha-olefins having from 2 to 20,000, preferably from 2 to 20, more preferably from 2 to 8 carbon atoms, combinations of two or more of such alpha-olefins, and further combinations with one or more conjugated or nonconjugated $C_{4-20}$ dienes. Particularly suitable alpha-olefins include, for example, ethylene, propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{4-10}$ dienes, including 1,4-butadiene, 1,4-hexadiene, and ethylidenenorbornene. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

The supported catalyst compositions can be formed in situ in the polymerization mixture by introducing into said mixture an unactivated supported metal complex of the present invention and a suitable cocatalyst, preferably a cation forming activating cocatalyst, along with other components of the polymerization, including olefin reagents, solvents or diluents. Preferably however, the metal complex containing one or more ortho-metal bound ligands and an activating cocatalyst are first combined in a suitable solvent or diluent, followed by combination with the solid particulated, ethylenically- or polyethylenically-functionalized support, and the resulting supported catalyst composition is added to the polymerization mixture, with or without intermediate recovery of the supported catalyst composition.

The supported catalyst composition can be advantageously employed in a high pressure, solution, slurry or gas phase polymerization process. A high pressure process is usually carried out at temperatures from 100 to 400° C. and at pressures above 50.0 MPa. A slurry process typically uses an inert hydrocarbon diluent and temperatures of from 0° C. up to a temperature just below the temperature at which the resulting polymer becomes substantially soluble in the inert polymerization medium. Preferred temperatures are from 40° C. to 115° C. The solution process is carried out at temperatures from the temperature at which the resulting polymer is soluble in an inert solvent up to 275° C., preferably at temperatures of from 130° C. to 260° C., more preferably from 150° C. to 240° C. Preferred inert solvents are $C_{1-20}$ hydrocarbons and preferably $C_{5-10}$ aliphatic hydrocarbons, including mixtures thereof. The solution and slurry processes are usually carried out at pressures between 100 kPa to 10 MPa. Typical operating conditions for gas phase polymerizations are from 20 to 100° C., more preferably from 40 to 80° C. In gas phase processes the pressure is typically from 10 kPa to 10 MPa. Condensed monomer or diluent may be injected into the reactor to assist in heat removal by means of latent heat of vaporization.

Preferably for use in gas phase polymerization processes, the support has a median particle diameter from 20 to 200 μm, more preferably from 30 μm to 150 μm, and most preferably from 50 μm to 100 μm. Preferably for use in slurry polymerization processes, the support has a median particle diameter from 1 to 200 μm, more preferably from 5 μm to 100 μm, and most preferably from 20 μm to 80 μm. Preferably for use in solution or high pressure polymerization processes, the support has a median particle diameter from 1 to 40 μm, more preferably from 1 μm to 30 μm, and most preferably from 1 μm to 20 μm.

In the present polymerization process, molecular weight control agents, chain transfer agents, and/or chain shuttling agents can also be employed. Examples of such agents include hydrogen, organo metal compounds such as trialkylaluminum or dialkyl zinc compounds, and other known compounds. Use of chain shuttling agents to prepare segmented polymers has been previously disclosed in WO2005/09425, WO2005/09426, and WO2005/09427, among other disclosures.

Specific Embodiments

The following specific embodiments of the invention and combinations thereof are especially desirable and hereby delineated in order to provide detailed disclosure for the appended claims.

1. A supported metal complex comprising the reaction product of:
   (A) a transition metal complex of a polyvalent heteroaryl donor ligand containing at least one ortho-metallated aromatic ligand group, and
   (B) an ethylenically or poly(ethylenically) functionalized particulated organic or inorganic solid.
2. A supported metal complex according to embodiment 1 wherein the particulated solid is silica modified by reaction with a trialkylaluminum compound and further functionalized by reaction with an ethylenically unsaturated compound containing protonated Lewis base functionality.
3. A supported metal complex according to embodiment 2 wherein the ethylenically unsaturated compound containing protonated Lewis base functionality is a hydroxyl, thiol, amine or phosphine functionalized compound containing vinyl functionality.
4. A supported metal complex according to embodiment 2 wherein the ethylenically unsaturated compound containing protonated Lewis base functionality is an ethylenically or polyethylenically unsaturated primary aliphatic alcohol, amine, thiol or phosphine containing from 3 to 20 carbons.
5. A supported metal complex according to embodiment 1 wherein the metal complex is a cationic complex or is activated for polymerization of olefins by combination with a cocatalyst prior to combination with the particulated solid.
6. A supported metal complex according to embodiment 1 wherein the metal complex is a Group 4 metal complex.
7. A supported metal complex according to embodiment 3 wherein the metal complex is [[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$,κ$N^2$] methyl hafnium]$^+$[tris(pentafluorophenyl)methyl borate]$^-$.
8. A supported metal complex useful for the addition polymerization of addition polymerizable monomers, said composition comprising a transition metal complex of a polyvalent heteroaryl donor ligand, and a functionalized particulated organic or inorganic solid, wherein the transition metal complex is covalently bound to the particulated solid by means of addition of ethylenic functional groups of the solid to one or more ortho-metal-aryl bonds of the transition metal complex.
9. A supported metal complex according to embodiment 8 wherein the particulated solid is silica modified by reaction with a trialkylaluminum compound and further functionalized by reaction with an ethylenically unsaturated compound containing protonated Lewis base functionality.
10. A supported metal complex according to embodiment 9 wherein the ethylenically unsaturated compound containing protonated Lewis base functionality is a hydroxyl, thiol, amine or phosphine functionalized compound containing vinyl functionality.
11. A supported metal complex according to embodiment 9 wherein the ethylenically unsaturated compound containing protonated Lewis base functionality is an ethylenically or polyethylenically unsaturated primary aliphatic alcohol, amine, thiol or phosphine containing from 3 to 20 carbons.
12. A supported metal complex according to embodiment 8 wherein the metal complex is a cationic complex or is activated for polymerization of olefins by combination with a cocatalyst.
13. A supported metal complex according to embodiment 12 wherein the metal complex is Group 4 metal complex.
14. A supported metal complex according to embodiment 12 wherein the metal complex is [[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$,κ$N^2$]methyl hafnium]$^+$[tris(pentafluorophenyl)methyl borate]$^-$.

15. A process for preparing a support comprising pendant ethylenically unsaturated groups comprising combining an inorganic oxide material comprising Lewis acid functionalized surface hydroxyl groups with a protonated Lewis base functionalized, ethylenically unsaturated aliphatic compound.

16. A process for preparing a support comprising pendant vinyl functional groups comprising combining an inorganic oxide material comprising Lewis acid functionalized surface hydroxyl groups with a hydroxyl-, thiol-, alkylamino-, di(alkyl)amino-, alkylphosphino-, or di(alkyl)phosphino-substituted vinyl aliphatic compound.

17. A process according to embodiment 15 wherein the vinyl aliphatic compound is a vinyl substituted primary aliphatic alcohol having from 6 to 20 carbons.

18. An addition polymerization process comprising contacting one or more addition polymerizable monomers under addition polymerization conditions with a supported catalyst composition according to any one of embodiments 1-14 or preparable according to any one of embodiments 15-17.

Having described the invention the following examples are provided as further illustration thereof and are not to be construed as limiting. Unless stated to the contrary all parts and percentages are expressed on a weight basis. The bulk density of the polymers produced was determined according to ASTM 1895.

EXAMPLES

Tri(ethyl)aluminum modified silica (($C_2H_5$)$_2$Al—O—Silica) Support A

In an inert atmosphere glove box, 6.00 g of silica having number average particle size of 25 μm (ES-757™ available from Ineos Corporation) which has been calcined in air at 200° C. for 12 hours is added to a 100 ml glass flask and slurried in 30 ml of toluene. To the agitating slurry is added, dropwise, 12.0 mL of a 1 M solution of triethylaluminum in hexanes. The mixture is agitated on a mechanical shaker for 4 hours. The resulting solids are collected on a fritted funnel, washed twice with 30 mL toluene, and dried under reduced pressure for 16 hours.

Example 1

ω-Undecenyloxy(ethyl)aluminum modified silica
($CH_2$=$CH_2$—($C_9H_{18}$)—O—Al($C_2H_5$)—O—Silica)
(vinyl functionalize support according to the present invention)

In an inert atmosphere glove box, 4.00 g of support A is added to a 100 ml glass flask and slurried in 20 ml of toluene. To the agitating slurry is added, dropwise, 0.16 mL (200 μmol) of ω-undecenyl alcohol. The mixture is agitated on a mechanical shaker for 2 hours. The resulting solids are collected on a fritted funnel, washed twice with 20 mL toluene, and dried under reduced pressure for 16 hours.

Catalyst A* (Comparative)

In an inert atmosphere glove box, 1.00 g of support A is added to a 20 ml glass flask and slurried in 5 ml of toluene. To the agitating slurry is added, dropwise, 7.5 mL of a 0.04 M solution of tris(pentafluorophenyl)boron in toluene. Next, 2.5 mL of a 0.04 M solution of [N-[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$,κ$N^2$]hafnium dimethyl, prepared according to US-A-2004/0220050, is diluted with 5 mL additional toluene and added to the slurry, thereby forming the active catalyst species, believed to be [[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$,κ$N^2$]methyl hafnium]$^+$[tris(pentafluorophenyl)methylborate]$^-$. The mixture is agitated on a mechanical shaker for 2 hours. The resulting solids are collected on a fritted funnel, washed twice with 10 mL toluene, and dried under reduced pressure for 16 hours.

Example 2

Supported Catalyst According to the Invention

In an inert atmosphere glove box, 1.00 g of support B (Example 1) is added to a 20 ml glass flask and slurried in 5 ml of toluene. To the agitating slurry is added, dropwise, 7.5 mL of a 0.04 M solution of tris(pentafluorophenyl)boron in toluene. Next, 2.5 mL of a 0.04 M solution of [N-[2,6-bis(1-methylethyl)phenyl]-α-[2-(1-methylethyl)phenyl]-6-(1,2-naphthalendiyl-κ-$C^2$)-2-pyridinemethanaminato (2-)-κ$N^1$, κ$N^2$]hafnium dimethyl is diluted with 5 mL additional toluene and added to the slurry. The mixture is agitated on a mechanical shaker for 2 hours. The resulting solids are collected on a fritted funnel, washed twice with 10 mL toluene, and dried under reduced pressure for 16 hours.

The foregoing preparation of a supported tethered, activated, metal complex is illustrated schematically in the following diagram:

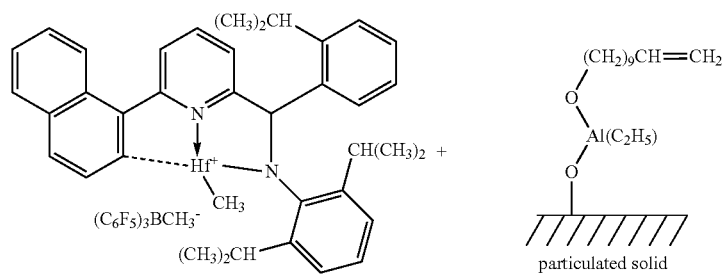

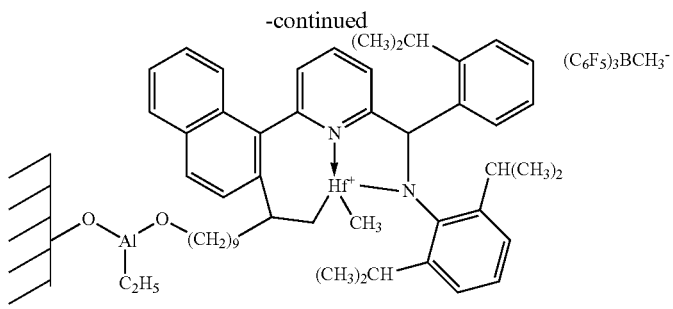

Slurry Batch Reactor Polymerization

A cleaned, nitrogen purged, 2 liter, jacketed and stirred autoclave reactor is charged with 0.5 g of triethylaluminum modified silica scavenger (Support A), followed by 600 sccm of $H_2$ and 680 g of propylene. The mixture is stirred for 5 minutes and then heated to 70° C. Supported catalyst (0.25 g slurried in 10 mL hexane) is added by nitrogen pressure. After 40 minutes polymerization, the reactor is vented and cooled and the resulting polymer (if any) removed from the reactor. Results are contained in Table 1.

TABLE 1

| Run | Catalyst | Support | Efficiency (kg/g Hf) |
|---|---|---|---|
| 1* | A* | A | 0 |
| 2 | Example 2 | Example 1 | 1308 |

*Comparative, not an example of the invention

The lack of polymerization activity for the comparative catalyst demonstrates that effective tethering of the metal complex to the silica surface is accomplished according to the invention due, it is believed, to insertion of the silica bound unsaturated vinyl functionality into the available ortho-metallated functionality of the metal complex, without loss of active catalyst species (believed to be a cationic complex) or leaching of the activated metal complex from the silica under slurry polymerization conditions.

What is claimed is:

1. A supported metal complex comprising the reaction product of:
   (A) a transition metal complex of a polyvalent heteroaryl donor ligand containing at least one ortho-metallated aromatic ligand group, and
   (B) an ethylenically or poly(ethylenically) functionalized particulated organic or inorganic solid.

2. A supported metal complex according to claim 1 wherein the particulated solid is silica modified by reaction with a trialkylaluminum compound and further functionalized by reaction with an ethylenically unsaturated compound containing protonated Lewis base functionality.

3. A supported metal complex according to claim 2 wherein the ethylenically unsaturated compound containing protonated Lewis base functionality is a hydroxyl, thiol, amine or phosphine functionalized compound containing vinyl functionality.

4. A supported metal complex according to claim 2 wherein the ethylenically unsaturated compound containing protonated Lewis base functionality is an ethylenically or polyethylenically unsaturated primary aliphatic alcohol, thiol, amine, or phosphine containing from 3 to 20 carbons.

5. A supported metal complex according to claim 1 wherein the metal complex is a cationic complex or is activated for polymerization of olefins by combination with a cocatalyst prior to combination with the particulated solid.

6. A supported metal complex according to claim 1 wherein the metal complex is a Group 4 metal complex.

7. A supported metal complex according to claim 3 wherein the metal complex is [[2,6-bis(1-methylethyl)phenyl]-α-[2-(1-methylethyl)phenyl]-6-(1,2-naphthalendiyl-κ-$C^2$)-2-pyridinemethanaminato (2-)-$κN^1,κN^2$]methyl hafnium]$^+$[tris(pentafluorophenyl)methyl borate]$^-$.

8. An addition polymerization process comprising contacting one or more addition polymerizable monomers under addition polymerization conditions with a supported metal complex of claim 1.

9. A supported catalyst composition useful for the addition polymerization of addition polymerizable monomers, said composition comprising a transition metal complex of a polyvalent heteroaryl donor ligand, and a functionalized particulated organic or inorganic solid, wherein the transition metal complex is covalently bound to the particulated solid by means of addition of ethylenic functional groups of the solid to one or more ortho-metal-aryl bonds of the transition metal complex.

10. A supported catalyst composition according to claim 9 wherein the particulated solid is silica modified by reaction with a trialkylaluminum compound and further functionalized by reaction with an ethylenically unsaturated compound containing protonated Lewis base functionality.

11. A supported catalyst composition according to claim 10 wherein the ethylenically unsaturated compound containing Lewis base functionality is a hydroxyl, thiol, amine or phosphine functionalized compound containing vinyl functionality.

12. A supported catalyst composition according to claim 10 wherein the ethylenically unsaturated compound containing Lewis base functionality is an ethylenically or polyethylenically unsaturated primary aliphatic alcohol, amine, thiol or phosphine containing from 3 to 20 carbons.

13. A supported catalyst composition according to claim 9 wherein the metal complex is a cationic complex or is activated for polymerization of olefins by combination with a cocatalyst.

14. A supported catalyst composition according to claim 13 wherein the metal complex is Group 4 metal complex.

15. A supported catalyst composition according to claim 13 wherein the metal complex is [[2,6-bis(1'-methylethyl)phenyl]-α-[2-(1'-methylethyl)phenyl]-6-(1,2-naphthalendiyl-κ-$C^2$)-2-pyridinemethanaminato (2-)-$κN^1, κN^2$]methyl hafnium]$^+$[tris(pentafluorophenyl)methyl borate]$^-$.

* * * * *